United States Patent
Furuta

(10) Patent No.: US 9,674,607 B2
(45) Date of Patent: Jun. 6, 2017

(54) SOUND COLLECTING APPARATUS, CORRECTION METHOD OF INPUT SIGNAL OF SOUND COLLECTING APPARATUS, AND MOBILE EQUIPMENT INFORMATION SYSTEM

(71) Applicant: MITSUBISHI ELECTRIC CORPORATION, Chiyoda-ku (JP)

(72) Inventor: Satoru Furuta, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/025,975

(22) PCT Filed: Jan. 28, 2014

(86) PCT No.: PCT/JP2014/000412
§ 371 (c)(1),
(2) Date: Mar. 30, 2016

(87) PCT Pub. No.: WO2015/114674
PCT Pub. Date: Aug. 6, 2015

(65) Prior Publication Data
US 2016/0241954 A1 Aug. 18, 2016

(51) Int. Cl.
*H04R 3/00* (2006.01)
*H04R 29/00* (2006.01)
(Continued)

(52) U.S. Cl.
CPC .......... *H04R 3/005* (2013.01); *G10L 21/0316* (2013.01); *H04R 29/004* (2013.01);
(Continued)

(58) Field of Classification Search
CPC ...... H04R 3/005; H04R 29/004; H04R 1/406; H04R 2430/03; H04R 2499/11; H04R 2499/13; G10L 21/0316; G10L 15/00
See application file for complete search history.

(56) References Cited

U.S. PATENT DOCUMENTS

| 6,088,670 A | 7/2000 | Takada |
| 2010/0082338 A1 | 4/2010 | Togawa et al. |
| 2011/0313763 A1 | 12/2011 | Amada |

FOREIGN PATENT DOCUMENTS

| EP | 2 196 990 A2 | 6/2010 |
| JP | 2-272836 | 11/1990 |

(Continued)

OTHER PUBLICATIONS

International Search Report Issued Mar. 18, 2014 in PCT/JP14/00412 Filed Jan. 28, 2014.

*Primary Examiner* — Sonia Gay
(74) *Attorney, Agent, or Firm* — Oblon, McClelland, Maier & Neustadt, L.L.P.

(57) ABSTRACT

A small-signal power acquisition unit defines a threshold for each of a plurality of input signals based on a long-term average of a minimum power of the corresponding input signal, each of the input signals being obtained by a microphone, sets a power value of each input signal that is smaller than the corresponding defined threshold to be a small-signal power of the input signal. A correction amount setting unit obtains each correction amount for correcting the input signals based on the small-signal power of the corresponding input signal. A correction unit corrects each of the input signals based on each of the correction amounts for correcting the input signals.

7 Claims, 9 Drawing Sheets

(51) Int. Cl.
  *G10L 21/0316*    (2013.01)
  *G10L 15/00*      (2013.01)
  *H04R 1/40*       (2006.01)

(52) U.S. Cl.
  CPC .............. *G10L 15/00* (2013.01); *H04R 1/406* (2013.01); *H04R 2430/03* (2013.01); *H04R 2499/11* (2013.01); *H04R 2499/13* (2013.01)

(56) References Cited

FOREIGN PATENT DOCUMENTS

| | | |
|---|---|---|
| JP | 7-152397 | 6/1995 |
| JP | 10-301600 | 11/1998 |
| JP | 2000-250568 A | 9/2000 |
| JP | 2002-31674 A | 1/2002 |
| JP | 2002-99297 A | 4/2002 |
| JP | 4181066 | 11/2008 |
| JP | 2009-55343 A | 3/2009 |
| JP | 2010-139571 A | 6/2010 |
| JP | 2010-232717 A | 10/2010 |
| JP | 2010-250152 A | 11/2010 |
| JP | 2011-124873 A | 6/2011 |
| WO | 2010/109708 A1 | 9/2010 |

SOUND COLLECTING APPARATUS, CORRECTION METHOD OF INPUT SIGNAL OF SOUND COLLECTING APPARATUS, AND MOBILE EQUIPMENT INFORMATION SYSTEM

FIELD

The present invention relates to a sound collecting apparatus collecting sounds such as voice using a plurality of sound collecting devices.

BACKGROUND

Microphone array processing that efficiently collects sounds such as voice and music using a plurality of microphones (microphone array) has been devised and widely used. Generally, the frequency characteristics and gain characteristics of microphones are not the same and vary depending on individuals due to individual differences during manufacturing, changes with time, installation environments, or other factors. Since the sound collection performance degrades when there are differences in the frequency characteristics and gain characteristics of microphones to be used in microphone array processing, the signals obtained from the microphones are corrected to eliminate the differences between the characteristics of the microphones.

There is a method that generates sounds for calibration (calibration sounds) using a sound source device such as a speaker and, based on the signal of the calibration sounds obtained by microphones, corrects the obtained signals to eliminate variations between the characteristics of the microphones. However, this method requires a sound source device generating calibration sounds. On the other hand, there is proposed a method that, using signals obtained by microphones from sounds reaching the microphones, especially the sounds to be collected (referred to below as target sounds) such as voice, corrects the signals itself successively so as to eliminate the differences between the characteristics of the microphones without using a sound source device (PTL 1).

CITATION LIST

Patent Literature

PTL 1: JP-A-2009-55343 (FIG. 7)

SUMMARY

Technical Problem

However, when the signals are corrected based on the signals obtained by the microphones from the sound reaching the microphones, the correction may become inappropriate for the collection of the target sounds because, for example, the position of the sound source of the obtained sounds is different from the position of the sound source of the target sounds. In addition, even when an attempt is made to correct the signals based on the signals obtained from the target sounds, the signals may be erroneously corrected based on the signals obtained from the sounds other than the target sounds, in this case, the correction may also become inappropriate for the collection of the target sounds.

As described above, a conventional sound collecting apparatus using a microphone array may perform correction that is inappropriate for the target sounds to be collected.

The invention addresses the above problem with an object of providing a sound collecting apparatus that corrects the signals obtained by a plurality of microphones of a microphone array using the sounds reaching the microphones and reduces the possibility of inappropriately correcting for the sounds to be collected.

Means for Solving the Problem

In accordance with the present invention, there is provided a sound collecting apparatus comprising a small-signal power acquisition unit that defines a threshold for each of a plurality of input signals based on a long-term average of a minimum power of the corresponding input signal, each of the input signals being obtained by a microphone, and sets a power value of each input signal that is smaller than the corresponding defined threshold to be a small-signal power of the input signals, wherein the long-term average is calculated for each input signal based on a plurality of forgetting coefficient values being applied according to power of the input signal, a correction amount setting unit that obtains each correction amount for correcting the input signals based on the small-signal power of each of the input signals and a correction unit that corrects each of the input signals based on each of the correction amounts for correcting the input signals.

In accordance with the present invention, there is provided an input signal correcting method applied to a sound collecting apparatus which generates a signal of collected target sound from a plurality of input signals each obtained by a microphone, the input signal correcting method comprising defining a threshold for each of the input signals based on a long-term average of a minimum power of the corresponding input signal, wherein the long-term average is calculated for each input signal based on a plurality of forgetting coefficient values being applied according to a power of the input signal, setting a power value of each input signal that is smaller than the corresponding defined threshold to be a small-signal power of the input signal, obtaining each correction amount for correcting each of the input signals based on the small-signal power of the input signal and correcting each of the input signals based on the correction amount for correcting the input signal.

In accordance with the present invention, there is provided a mobile equipment information system comprising a sound collecting apparatus that generates an output signal that is a signal of collected target sound emphasized by use of corrected input signals, each of the input signals being obtained by a microphone and at least one of a route guidance device which guides a route based on voice recognition result of the output signal of the sound collecting apparatus, a speech device which uses the output signal and an active silencing device which uses the output signal, wherein the sound collecting apparatus defines a threshold for each of the input signals based on a long-term average of minimum power of the corresponding input signal, the long-term average being calculated for each input signal based on a plurality of forgetting coefficient values being applied according to power of the input signal, sets a power value of each input signal that is smaller than the corresponding defined threshold to be a small-signal power of the input signal, obtains each correction amount based on each of the small-signal powers for correcting the input signal corresponding to the small-signal power and corrects each of the input signals based on each of the correction amounts.

Advantages of the Invention

Because the sound collecting apparatus in accordance with the present invention defines the threshold for each of the plurality of input signals based on the long-term average of the minimum power of the corresponding input signal, and sets the power value of each input signal that is smaller than the defined threshold to be a small-signal power of the input signal, the input signals being obtained by microphones composing a microphone array, obtains each correction amount for correcting the plurality of the input signals based on the small-signal power and corrects the input signals with the obtained correction amounts, the sound collecting apparatus can reduces the possibility of inappropriately correcting for the sounds to be collected.

Because the input signal correcting method in accordance with the present invention defines the threshold for each of the input signals based on the long-term average of the minimum power of the corresponding input signal, wherein the long-term average is calculated for each input signal based on a plurality of forgetting coefficient values being applied according to a power of the input signal, sets power of each input signal which is smaller than the defined first threshold to be a small-signal power of each of the input signals, the input signals being obtained by microphones composing a microphone array, obtains correction amounts based on the small-signal powers for correcting each of the input signals and corrects each of the input signals based on the obtained correction amounts, the sound collecting apparatus can reduces the possibility of inappropriately correcting for the sounds to be collected.

The route guidance device or the speech device or the active silencing device included in the mobile equipment information system in accordance with the present invention can works with better performance, because the sound collecting apparatus included in the mobile equipment information system defines a threshold for each of the input signals based on a long-term average of minimum power of the corresponding input signal, the long-term average being calculated for each input signal based on a plurality of forgetting coefficient values being applied according to power of the input signal, sets a power value of each input signal that is smaller than defined first threshold to be a small-signal power of the input signal, the input signals being obtained by obtained by a plurality of microphones, obtains each correction amount based on each of the small-signal power for collecting the input signal corresponding to the small-signal power, corrects each of the input signals based on the correction amount of each of the input signals and outputs an output signal of collecting target sound emphasized by use of corrected input signals, and the route guidance device, the speech device or the active silencing device use the output signal.

DESCRIPTION OF EMBODIMENTS

Figure 1:
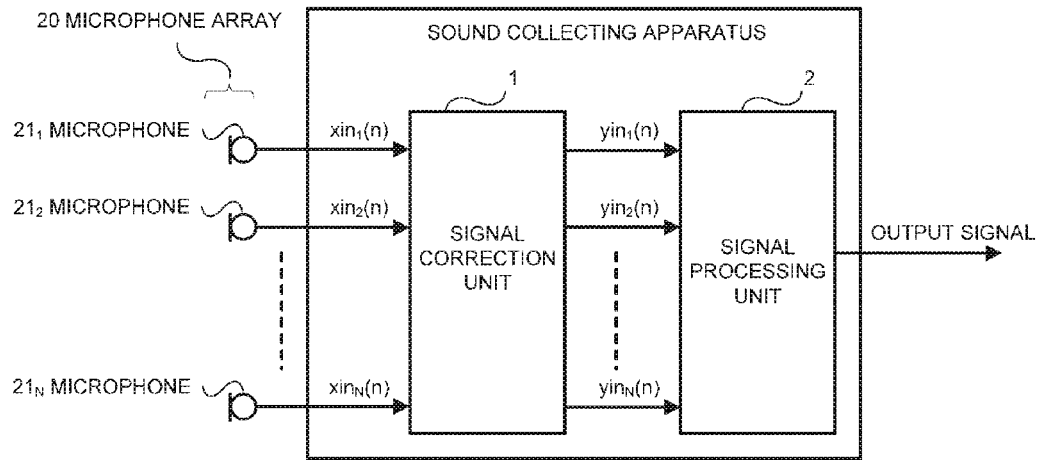
FIG. 1 is a block diagram illustrating the structure of a sound collecting apparatus according to embodiment 1 of the present invention.

Embodiments of the present invention will be described below with reference to the drawings. In the drawings to be referenced, the components identical or equivalent to each other are given the same symbols.

First Embodiment

FIG. 1 is a block diagram illustrating the structure of a sound collecting apparatus according to an embodiment of the invention. The sound collecting apparatus according to the embodiment includes a signal correction unit 1 that corrects the signals (input signals) of sounds obtained by a plurality of microphones $21_1$ to $21_N$ (N is a natural number equal to or more than 2) included in a microphone array 20 and a signal processing unit 2 that processes the signals corrected by the signal correction unit 1. In the following description, when, for example, a particular microphone does not need to be distinguished, the microphones $21_1$ to $21_N$ may be indicated as the microphones 21. This is true of the indication of other blocks and signals.

Input signals $xin_1(n)$ to $xin_N(n)$ to be input to the signal correction unit 1 in FIG. 1 are obtained by digitizing the electric signals of sound obtained by the microphones $21_1$ to $21_N$ using an AD (analog to digital) converter (not illustrated) of the sound collecting apparatus, sampling the signals at a defined sampling frequency (for example, 8 kHz), and dividing the signals into frames having a defined time period (for example, 10 milliseconds). Here, n represents a frame number for identifying each of the divided frames. In the following description, $xin_1(n)$ may be indicated as, for example, $xin_1$ by omitting (n).

Figure 2:
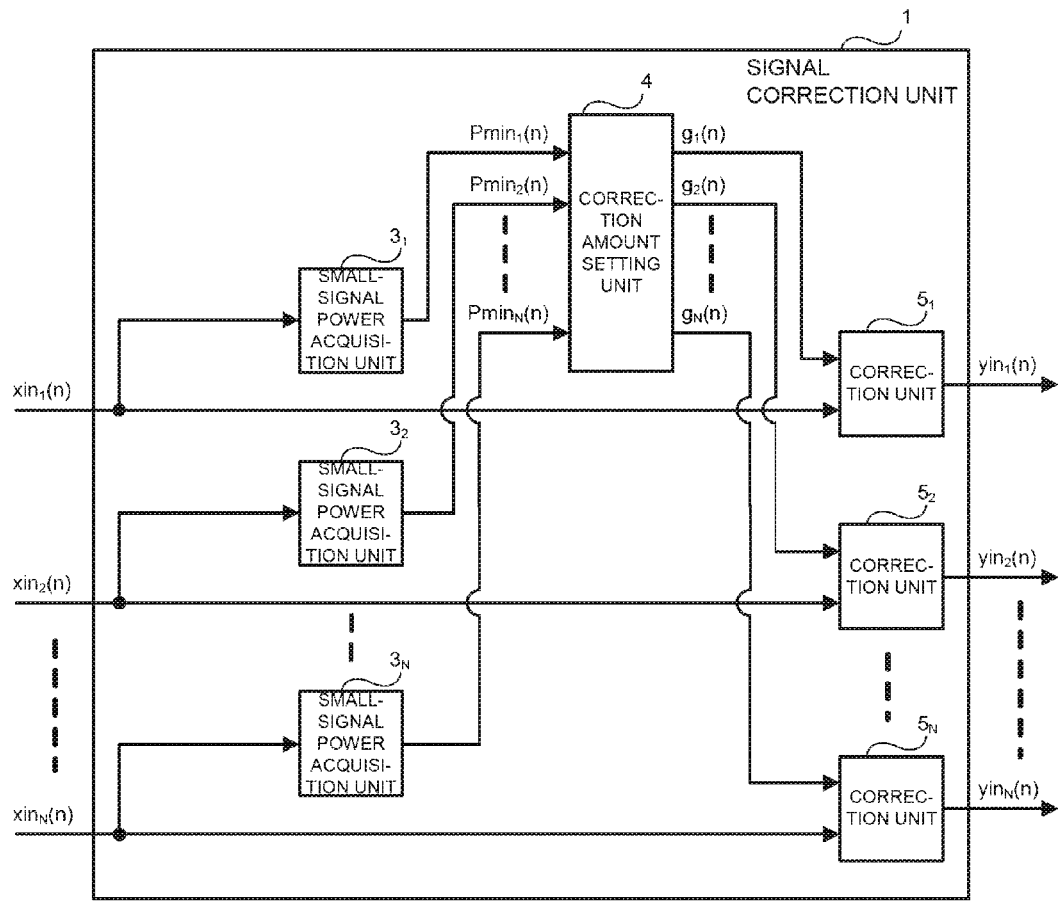
FIG. 2 is a block diagram illustrating the structure of a signal correction unit of the sound collecting apparatus according to embodiment 1 of the invention.

FIG. 2 is a block diagram illustrating an example of the structure of the signal correction unit 1. The signal correction unit 1 includes small-signal power acquisition units $3_1$ to $3_N$, a correction amount setting unit 4, and correction units $5_1$ to $5_N$. When the power of the input signals xin is smaller than a defined first threshold, the small-signal power acquisition units 3 determine the power to be a small-signal power Pmin and output it. Based on the small-signal power Pmin output by the small-signal power acquisition units 3, the correction amount setting unit 4 determines the correction amounts for correcting the corresponding input signals xin. The correction unit 5 corrects the input signals xin based on the correction amounts determined by the correction amount setting unit 4. Although the N small-signal power acquisition units $3_1$ to $3_N$ are provided so as to correspond to the N input signals $xin_1$ to $xin_N$, a plurality of input signals may be processed by one block. This is true of the correction units $5_1$ to $5_N$ and the like.

Figure 3:
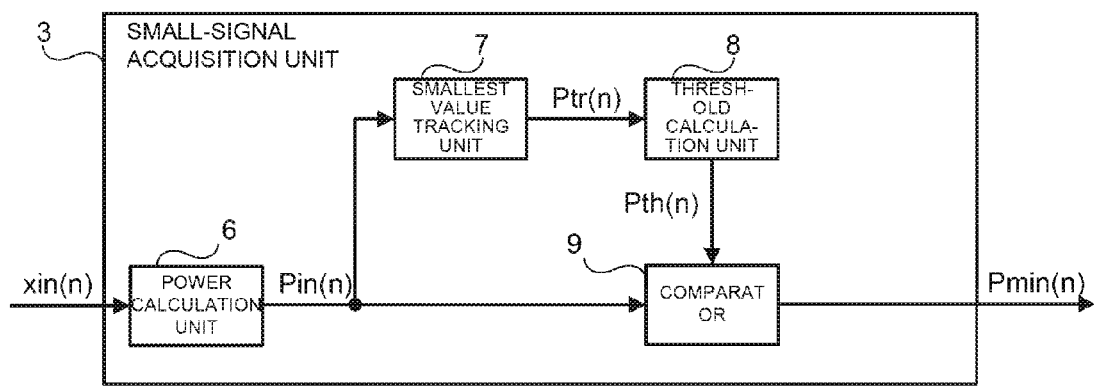
FIG. 3 is a block diagram illustrating the structure of a small-signal power acquisition unit of the sound collecting apparatus according to embodiment 1 of the invention.

FIG. 3 is a block diagram illustrating an example of the internal structure of the small-signal power acquisition unit 3. The small-signal power acquisition unit 3 includes a power calculation unit 6 calculating the power of the input signal xin, a smallest value tracking unit 7 obtaining the long-term average value of the minimum value of power, a threshold calculation unit 8 calculating the first threshold based on the long-term average value of the minimum value of power, and a comparator 9 comparing the power of the input signal xin with the first threshold and outputting the small-signal power Pmin. The small-signal power acquisition units $3_1$ to $3_N$ have the same structure.

The above signal correction unit 1; the signal processing unit 2; the small-signal power acquisition unit 3, the correction amount setting unit 4, and the correction unit 5 included in the signal correction unit 1; and the power calculation unit 6, the smallest value tracking unit 7, the threshold calculation unit 8, and the comparator 9 included in the small-signal power acquisition unit 3 can be achieved by hardware configured by a general purpose processor or DSP (Digital Signal Processor) and a peripheral circuit including a RAM (Random Access Memory) and the like and software executed by the processor. Alternatively, these blocks can be achieved by hardware such as ASICs (Application Specific Integrated Circuit) or the like.

Figure 4:
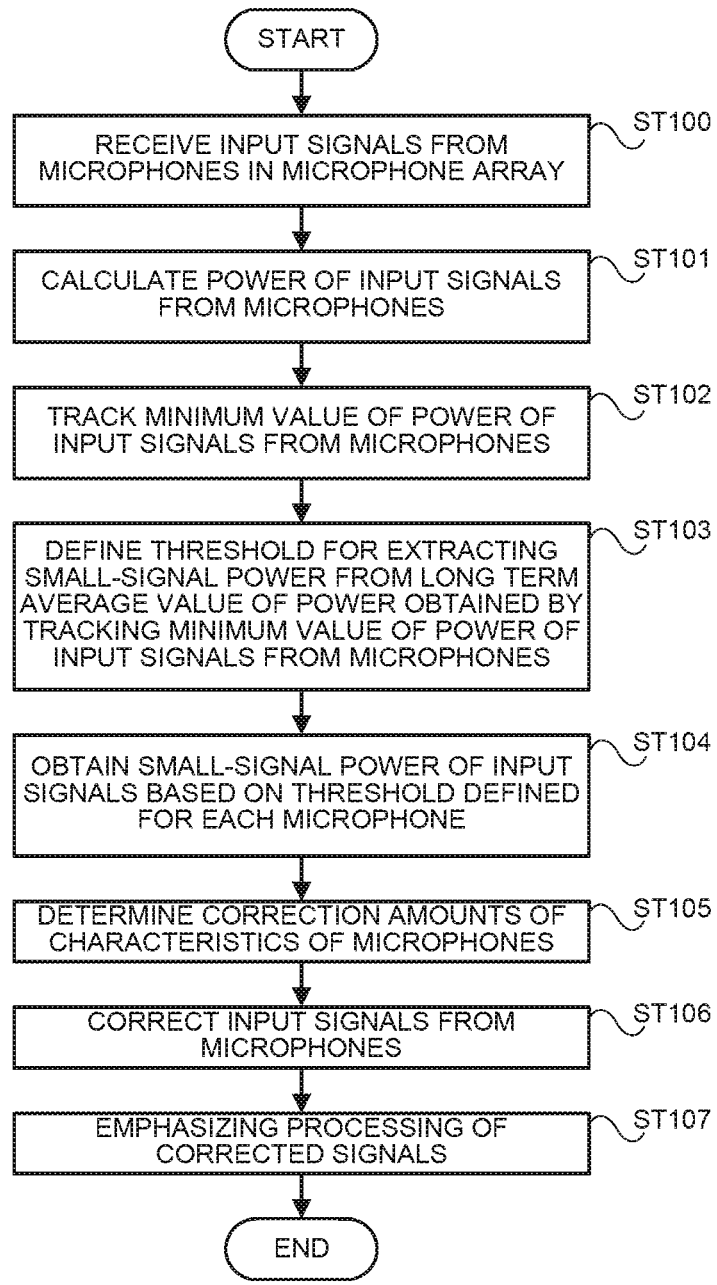
FIG. 4 is a flowchart illustrating a processing flow of the sound collecting apparatus according to embodiment 1 of the invention.

Next, the operation of the sound collecting apparatus according to the embodiment will be described. FIG. 4 is a flowchart illustrating a processing flow of the sound collecting apparatus according to the embodiment.

First, the signal correction unit 1 receives the input signals $xin_1(n)$ to $xin_N(n)$ of the input sounds including the target sounds such as voice or music and noise such as background noise other than the target sounds obtained by the microphones $21_1$ to $21_N$ of the microphone array 20 (ST100).

The small-signal power acquisition units $3_1$ to $3_N$ process the input signals $xin_1(n)$ to $xin_N(n)$ input to the signal correction unit 1 and output the small-signal power $Pmin_1(n)$ to $Pmin_N(n)$ of the input signals $xin_1(n)$ to $xin_N(n)$. The processing performed by the small-signal power acquisition unit 3 will be described in detail below with reference to FIGS. 3 and 4.

First, the power calculation unit 6 of the small-signal power acquisition unit 3 uses the input signal xin(n) to calculate the power of the current frame of the input signal according to expression (1) below and outputs the input signal power Pin(n) (ST101). In expression (1), n indicates the frame number, t is a number indicating the discrete time in the frame, and xin(n, t) indicates the amplitude of the input signal xin(n) in frame n at time t. M equals 80 for a sampling frequency of 8 kHz and 10 millisecond frame.

[Math. 1]

$$Pin(n) = 10\log\left(\sum_{i=0}^{M} xin^2(n, t)\right) \quad (1)$$

Upon receiving the input signal power Pin(n) output by the power calculation unit 6, the smallest value tracking unit 7 tracks the minimum value (minimum power) of the input signal power Pin(n) and calculates the long-term average value of the minimum value (ST102). Specifically, the smallest value tracking unit 7 calculates the long-term average value Ptr(n) of the minimum value of the input signal power Pin(n) according to expression (2) below. The smallest value tracking unit 7 outputs the calculated long-term average value Ptr(n) to the threshold calculation unit 8.

[Math. 2]

$$Ptr(n) = \begin{cases} Pin(n), & Ptr(n) > Pin(n) \\ \alpha \cdot Ptr(n-1) + (1-\alpha) \cdot Pin(n), & Ptr(n) \le Pin(n) \end{cases} \quad (2)$$

In expression (2), α indicates a time constant forgetting, which is given by, for example, expression (3) below. In expression (3) PNPOW_TH is a threshold to be defined in advance. When the input signal power Pin(n) is larger than PNPOW_TH, forgetting coefficient α is increased to reduce the forgetting speed. This prevents the power of the target sound from affecting the long-term average value Ptr(n) of the minimum value of the input signal power Pin(n) when a large power component of target sound such as voice is mixed into the input signal xin(n) and improves the tracking precision of the minimum value of the input signal power Pin(n).

[Math. 3]

$$\alpha = \begin{cases} 0.9995, & Pin(n) > PNPOW\_TH \\ 0.9, & Pin(n) \le PNPOW\_TH \end{cases} \quad (3)$$

Next, the threshold calculation unit 8 adds the defined value PADD(n) to the long-term average value Ptr(n) according to expression (4), defines the small-signal power threshold Pth(n), which is the first threshold of the input signal xin(n), and outputs it (ST103). A preferable example of the value PADD(n) in the embodiment is a constant value of 3 dB. However, this value may be changed depending on the type of input sounds as appropriate, for example, for each frame so that the input signal is corrected appropriately.

[Math. 4]

$$Pth(n)=Ptr(n)+PADD(n) \quad (4)$$

Next, the comparator 9 compares the input signal power Pin(n) with the small-signal power threshold Pth(n) according to expression (5) below, obtains the small-signal power Pmin(n) of the input signal xin(n), and outputs it (ST104). When Pin(n) is smaller than Pth(n), Pin(n) is output as Pmin(n). In contrast, when Pin(n) is equal to or more than Pth(n), Pmin(n−1), which is the value of the previous frame, is output.

[Math. 5]

$$Pmin(n) = \begin{cases} Pin(n), & Pin(n) < Pth(n) \\ Pmin(n-1), & Pin(n) \ge Pth(n) \end{cases} \quad (5)$$

The comparator 9 stores the small-signal power Pmin(n) of the input signal xin(n) that has been output to use it for processing of the next frame.

Figure 5:
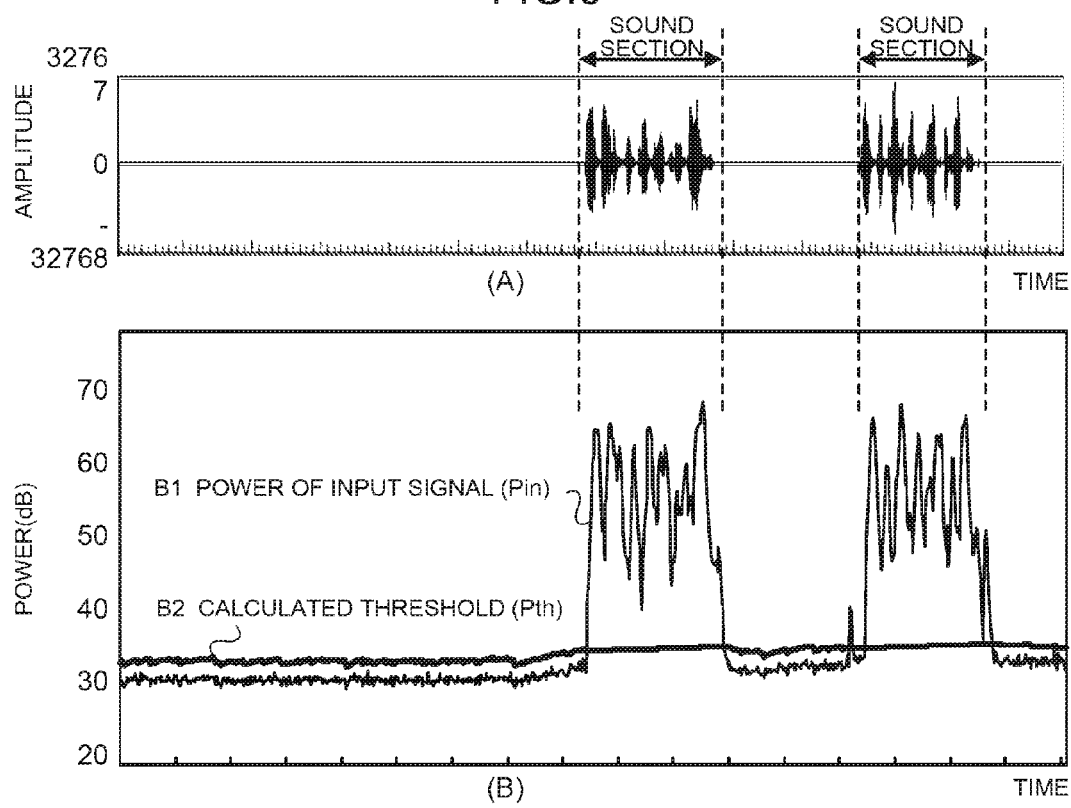
FIG. 5 is a graph illustrating an example of the power of an input signal and the small-signal power threshold of the sound collecting apparatus according to embodiment 1 of the invention.
Figure 6:
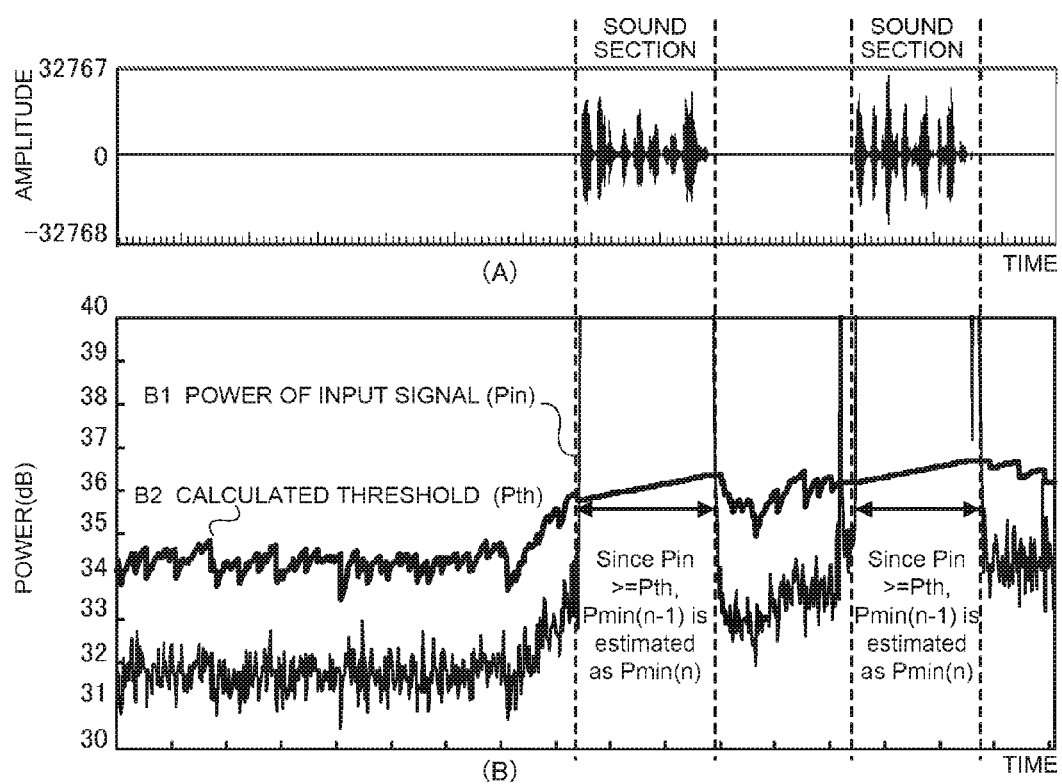
FIG. 6 is a graph obtained by enlarging a part of the graph illustrated in FIG. 5 in the vertical direction.

The principle of operation of the small-signal power acquisition unit 3 according to the embodiment will be described with reference to the graphs illustrated in FIGS. 5 and 6. In FIG. 5, (A) indicates changes over time in the waveform of the input signal xin having obtained voice and (B) indicates changes over time in the power of the input signal xin. In (B) in FIG. 5, the solid line B1 indicates the input signal power Pin calculated by the power calculation unit 6. In addition, the bold line B2 indicates the small-signal power threshold Pth calculated by the threshold calculation unit 8. FIG. 6 is a graph obtained by enlarging a part of (B) in FIG. 5 in the vertical direction.

In the frame of the section shown in FIGS. 5 and 6 in which the input signal power Pin is equal to or more than the small-signal power threshold Pth, since the small-signal power Pmin in the previous frame, instead of the input signal power Pin, is determined to the small-signal power Pmin in that frame, influence of the input signal power Pin of the section including voice (target sound) on the small-signal power Pmin can be suppressed.

Upon receiving the small-signal power $Pmin_1(n)$ to $Pmin_N(n)$ output by the small-signal power acquisition units $3_1$ to $3_N$, the correction amount setting unit 4 calculates and obtains a correction gain g(n), which is a correction amount for correcting the gains of the microphones 21 (ST105). In this example, the microphone $21_1$ is used as the reference in the calculation of a correction amount. Any one of the microphones $21_2$ to $21_N$ may be used as the reference instead of the microphone $21_1$. For example, when the position of the sound source of a target sound is known in advance, the microphone 21 closest to the sound source may be used as the reference. By using any one of the microphones 21 as the reference, the power reference for obtaining the correction amount does not need to be determined in advance.

The calculation of a correction amount will be described in detail. The correction amount setting unit 4 calculates correction gains $g_m(n)$ according to expression (6) below so that the small-signal powers $Pmin_1(n)$ to $Pmin_N(n)$ corresponding to the microphones $21_1$ to $21_N$ have the same level using the small-signal power $Pmin_1(n)$ concerning the microphone $21_1$ as the reference. Note that m indicates a natural number from 1 to N.

[Math. 6]

$$g_m(n)=10^{(Pmin1(n)-Pmin_m(n))/20} \quad (6)$$

The correction amount setting unit 4 outputs the calculated correction gains $g_1(n)$ to $g_N(n)$ to the correction units $5_1$ to $5_N$. Upon receiving the correction gains $g_1(n)$ to $g_N(n)$, the correction units $5_1$ to $5_N$ correct the input signals $xin_1(n)$ to $xin_N(n)$ according to the expression (7) below (ST106). In expression (6), m indicates a natural number from 1 to N. When using the microphone $21_1$ as the reference, since the correction gain $g_1(n)$ for the input signal $xin_1(n)$ is 1.0 based on expression (6), $xin_1(n)$ is equal to $yin_1(n)$. The correction unit 5 outputs the signals (referred to as corrected signals) $yin_1(n)$ to $yin_N(n)$ obtained by correcting the input signals $xin_1(n)$ to $xin_N(n)$ to the signal processing unit 2.

[Math. 7]

$$yin_m(n)=g_m(n)\cdot xin_m(n) \quad (7)$$

Upon receiving the corrected signals $yin_1(n)$ to $yin_N(n)$, the signal processing unit 2 outputs output signals by performing known emphasizing processing such as, for example, the delay and sum method or maximum likelihood method using the corrected signals $yin_1(n)$ to $yin_N(n)$ (ST107).

As described above, the sound collecting apparatus according to the embodiment, tracks the minimum values of the powers of input signals from the microphones of a microphone array, defines small-signal power threshold, which is the first threshold of the powers of the input signals, determines the powers of the input signals smaller than the small-signal power threshold to be small-signal powers, and calculates the correction amount for correcting input signals from the microphones based on the small-signal powers.

Accordingly, input signals can be corrected based on the input signals having power smaller than the defined threshold, so input signals obtained by microphones can be corrected while reducing the possibility of inappropriately correcting the sound to be collected. This is because omnidirectional sound such as background noise is suited to the correction of input signals for reducing the differences between the characteristics of microphones and input signals having small power can be assumed to be the signals of diffused omnidirectional sound.

In addition, since the first threshold is defined by tracking the minimum value of the powers of input signals from microphones, this threshold does not need to be determined in advance and the differences between the characteristics of microphones can be corrected flexibly depending on the use environment of the sound collecting apparatus.

Second Embodiment

Although, control is made according to the minimum value of the powers (minimum power) of input signals in embodiment 1, the precision of correction can also be improved by analyzing the aspect of input signals.

Figure 7:
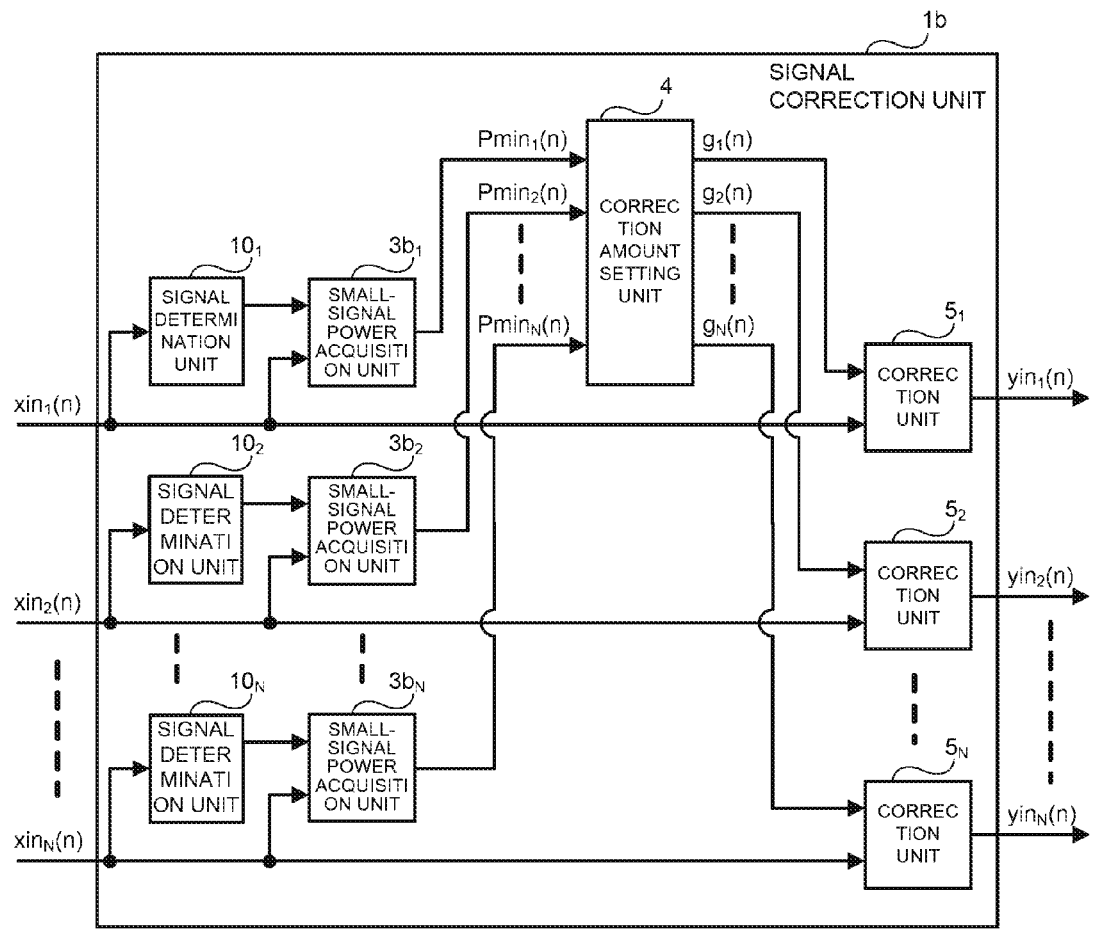
FIG. 7 is a block illustrating the structure of a signal correction unit of a sound collecting apparatus according to embodiment 2 of the invention.

FIG. 7 is a block diagram illustrating the structure of a signal correction unit 1b of a sound collecting apparatus according to embodiment 2 of the invention. The entire structure of the sound collecting apparatus according to embodiment 2 is similar to that in embodiment 1. The structure in FIG. 7 is different from the structure in embodiment 1 in that embodiment 2 has signal determination units 10 analyzing input signals and analysis results by the signal determination units 10 are input to small-signal power acquisition units 3b.

The signal determination units 10 may be achieved by processors, programs executed by processors, or hardware such as ASICs, as in other blocks.

The operation of the sound collecting apparatus according to the embodiment will be described focusing on the differences from the operation in embodiment 1. The signal correction unit 1b receives the input signals $xin_1(n)$ to $xin_N(n)$ as in embodiment 1. In the embodiment, the input signals $xin_1(n)$ to $xin_N(n)$ received by the signal determination units 10 are first analyzed. Then, the signal determination units 10 determine whether the received input signals $xin_1$ are, for example, voice or noise and output the results to the small-signal power acquisition units 3b as determination information. For example, autocorrelation analysis may be used to analyze the input signals $xin_1(n)$ to $xin_N(n)$. The small-signal power acquisition units 3b stop tracking the minimum power based on the input determination information (for example, when the input, signals are not noise) or track the minimum power when the input signals are determined to be noise. The other processes are the same as in embodiment 1.

In the embodiment, by controlling the tracking of the minimum power using the result of analyzing the aspect of the input signals, more precise tracking is enabled and accurate gain correction is enabled. This is particularly effective when voice is frequently mixed into the input signals or when high level noise is mixed because the microphone is struck.

Third Embodiment

Although control is made according to the minimum power in the entire frequency band of input signals in embodiment 1, more flexible correction can be performed by converting input signals into frequency domain and segmenting correction for each spectrum component or frequency band of input signals.

Figure 8:
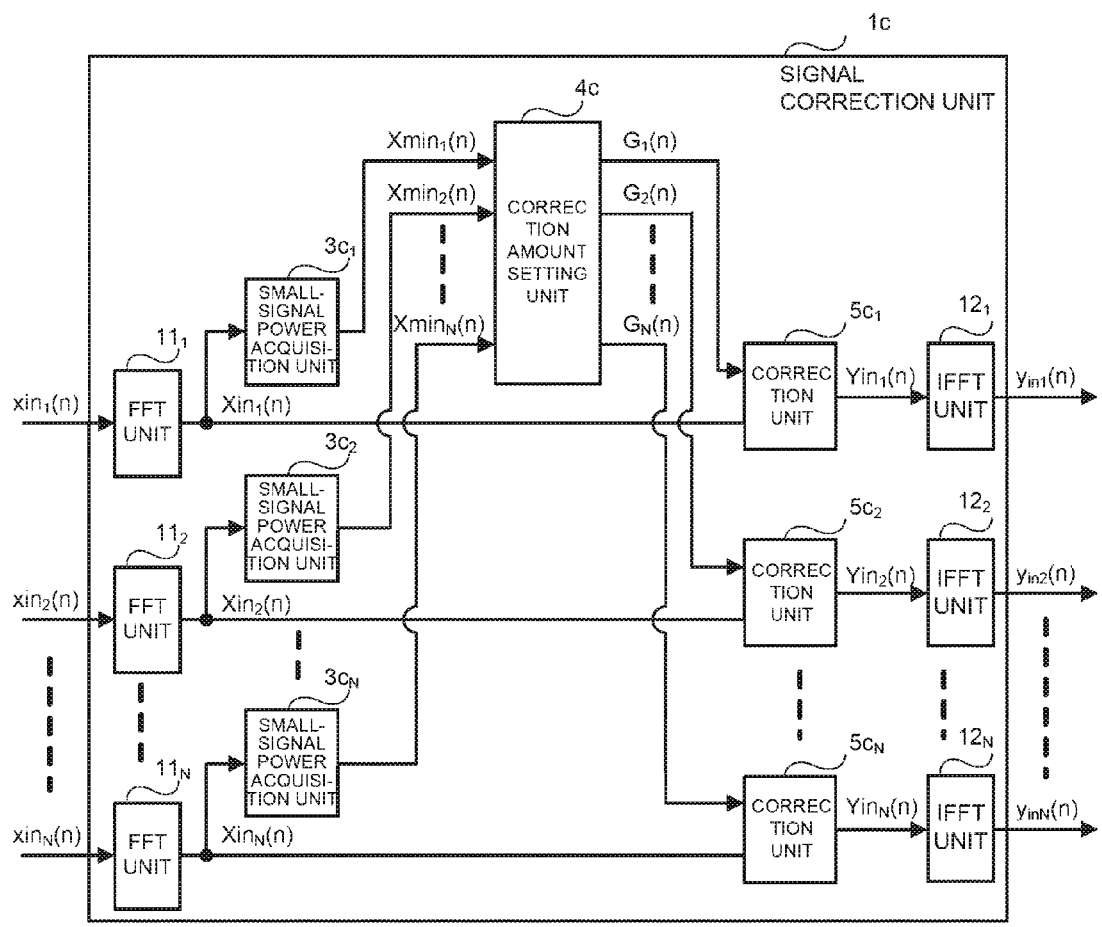
FIG. 8 is a block illustrating the structure of a signal correction unit of a sound collecting apparatus according to embodiment 3 of the invention.

FIG. 8 is a block diagram illustrating the structure of a signal correction unit 1c of a sound collecting apparatus according to embodiment 3 of the invention. The entire structure of the sound collecting apparatus according to embodiment 3 is similar to that in embodiment 1. The structure in FIG. 8 is different from the structure in embodiment 1 in that embodiment 3 has FFT units (spectrum transform units) 11 that perform fast Fourier transform (FFT) on input signals and IFFT units (inverse spectrum transform units) 12 that perform inverse FFT (IFFT) on corrected signals. Although the structure other than this is the same as in FIG. 2, small-signal power extracting units 3c, a correction amount setting unit 4c, and correction units 5c treat spectra as processing targets.

The FFT units 11 and the IFFT units 12 may be achieved by processors, programs executed by processors, or hardware such as ASICs, as in other blocks.

Next, the operation of the sound collecting apparatus according to the embodiment will be described focusing on the differences from the operation in embodiment 1. Since FFT processing and IFFT processing are known techniques, they are not described in detail. In the signal correction unit 1c according to the embodiment, first, the FFT units 11 perform FFT processing on the received input signals xin(n). Specifically, the FFT units 11 perform the FFT analysis indicated by expression (8) below and converts the input signals xin(n) into power spectrum Xin(n, k). Here, FFT(·) indicates FFT analysis, K indicates the total number of power spectrum obtained in this processing, and k indicates a number (spectrum number) from 0 to K−1 given to the obtained power spectrum. 8, the spectrum numbers are not indicated.

[Math. 8]

$$Xin(n,k)=FFT(xin(n)) \; k=0,\ldots,K-1 \quad (8)$$

Upon receiving the power spectrum Xin(n, k) output by the FFT units 11, the small-signal power acquisition units 3c obtain the power spectrum threshold (second threshold) for each spectrum in the same manner as in embodiment 1 described above and, based on the threshold, determine and output the small-signal power spectrum Xmin(n, k).

Next, the correction amount setting unit 4c calculates spectrum correction gains $G_1(n, k)$ to $G_N(n, k)$, which are the correction amounts of the spectrum, in the same manner as in embodiment 1 using small-signal power spectra $Xmin_1(n, k)$ to $Xmin_N(n, k)$ corresponding to the input signals $xin_1(n)$ to $xin_N(n)$.

Next, the correction units 5c correct the power spectrum Xin(n, k) of the corresponding input signals xin(n) using expression (9) below. In the expression, m indicates a natural number from 1 to N.

[Math. 9]

$$Yin_m(n,k)=G_m(n,k) \cdot Xin_m(n,k) \; k=0,\ldots,K-1 \quad (9)$$

Then, the IFFT units 12 re-transform the corresponding power spectra $Yin_1(n, k)$ to $Yin_N(n, k)$ having been corrected into time domain signals using IFFT processing and outputs the corrected signals $yin_1(n)$ to $yin_N(n)$ to the signal processing unit 2. The subsequent processing is the same as in embodiment 1.

Since embodiment 3 makes correction by calculating the correction amount for each power spectrum obtained by performing EFT processing on the input signal xin(n), it is possible to match the frequency characteristics and amplitude for each spectrum component or frequency band, not for the entire input signals, thereby enabling more accurate correction.

Figure 9:
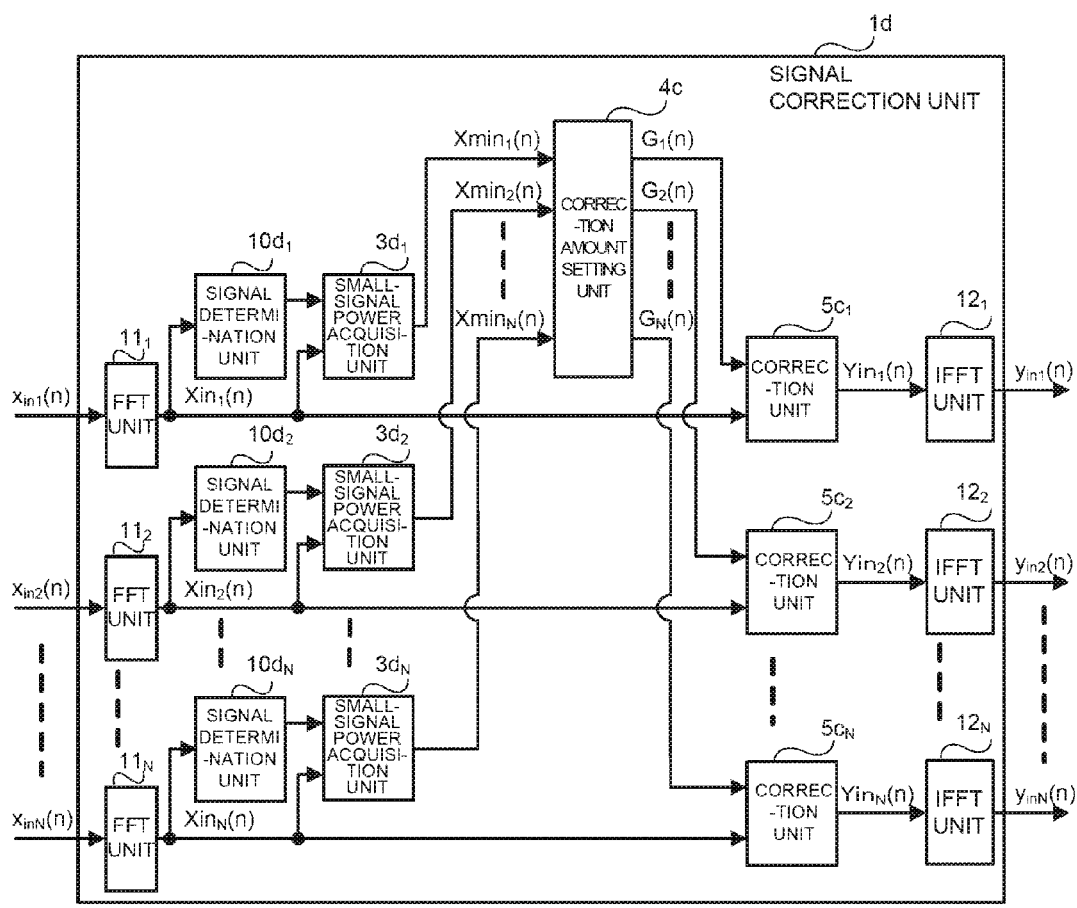
FIG. 9 is a block illustrating the structure of a modification of the signal correction unit of the sound collecting apparatus according to embodiment 3 of the invention.

In addition, as a modification of embodiment 3 above, the signal correction unit 1d may be configured so that the signal determination unit 10d that performs, as illustrated in FIG. 9, the analysis (similar to that in embodiment 2) of input signals on the spectrum of input signals is included and small-signal power acquisition units 3d perform processing similar to that in embodiment 2 using determination information output by the signal determination unit 10d.

Fourth Embodiment

The following describes an embodiment in which the sound collecting apparatuses described in embodiment 1 to embodiment 3 above are incorporated in a mobile equipment information system including a route guidance device or a speech device installed in mobile equipment such as an automobile or ship. In the following description, an in-vehicle information system is an example of the mobile equipment information system.

Figure 10:
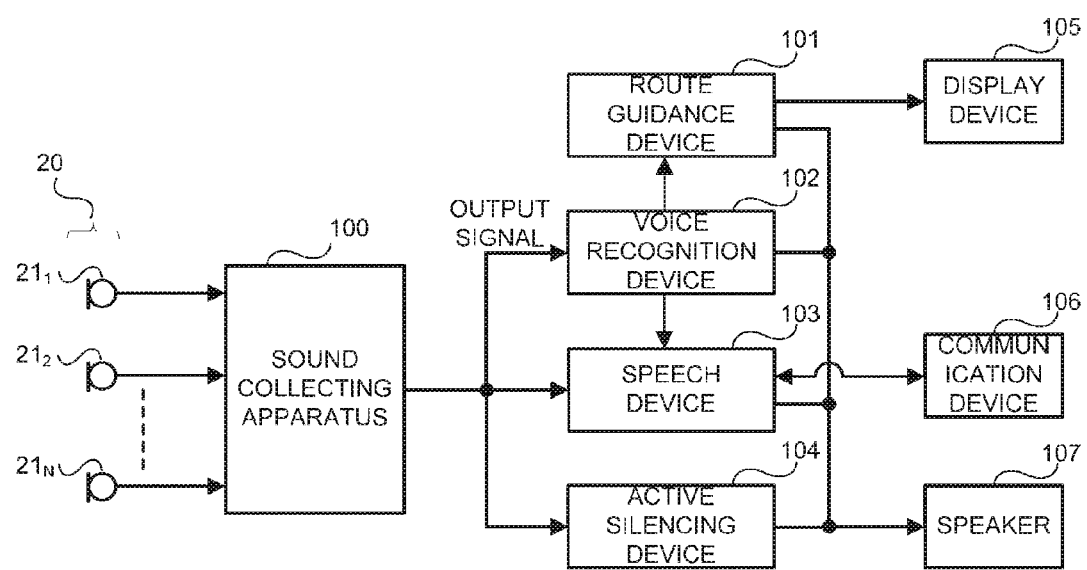
FIG. 10 is a block diagram illustrating the structure an in-vehicle information system (mobile equipment information system) according to embodiment 4 of the invention.

FIG. 10 is a block diagram illustrating an example of the structure of the in-vehicle information system according to the embodiment. The in-vehicle information system according to the embodiment includes a sound collecting apparatus 100 according to any one of embodiments 1 to 3 above, a route guidance device 101, a voice recognition device 102, a speech device 103, an active silencing device 104, the microphone array 20, a display device 105, a communication device 106, and a speaker 107. The structure illustrated in FIG. 10 is only an example and various other apparatuses may be combined.

Next, the operation of the in-vehicle information system will be described. The microphone array 20 inputs the signal of an obtained sound to the sound collecting apparatus 100. The sound collecting apparatus 100 performs the operation described in any one of embodiments 1 to 3 and outputs an output signal. The output signal output by the sound collecting apparatus 100 is received by the voice recognition device 102, the speech device 103, and the active silencing device 104.

The voice recognition device 102 performs voice recognition processing on the received output signal from the sound collecting apparatus 100 and outputs the instruction and the like issued by the user to the route guidance device 101 or the speech device 103. Upon receiving the instruction from the voice recognition device 102, the route guidance device 101 performs specified route guidance processing and displays the route guidance image on the display device 105 or outputs route guidance voice or the like using the speaker 107.

In addition, upon receiving the instruction from the voice recognition device 102, the speech device 103 controls the communication device 106. For example, when an instruction for starting speech is issued, the speech device 103 makes control so that the communication device 106 connects to the communication line for communicating with the communication partner. Then, the speech device 103 outputs the output signal received from the sound collecting apparatus 100 to the communication device 106. The communication device 106 communicates with the communication partner via the communication line and outputs the received signal to the speech device 103. The speech device 103 outputs the signal received from the communication device 106 using the speaker 107.

In addition, the active silencing device 104 predicts the environmental noise in the vehicle cabin using the output signal received from the sound collecting apparatus 100, generates the acoustic signal that cancels the environmental noise, and outputs the acoustic signal using the speaker 107 to reduce the noise in the vehicle cabin.

As described above, according to the embodiment, the sound collecting apparatus 100 of the in-vehicle information system can correct the signal obtained by the microphone while reducing the possibility of inappropriately correcting the sound to be collected using the sound reaching the microphone, so good output signals can be obtained. Accordingly, it is possible to improve the performance processing performed by the device of the in-vehicle information system using sound such as voice obtained by the microphone.

INDUSTRIAL APPLICABILITY

As described above, since the sound collecting apparatus or the sound collecting method according to the invention can generate the good signals of collected sound by correcting the signals of sounds obtained by a microphone array so as to reduce the differences between the characteristics of the microphones without using target sound to be collected, the sound collecting apparatus or the sound collecting method is useful for a system that performs processing based on the sounds collected by an in-vehicle information system such as a car navigation system.

REFERENCE SIGNS LIST

1, 1*b*, 1*c*, 1*d*: signal correction unit, 2: signal processing unit, 3, 3*b*, 3*c*, 3*d*: small-signal power acquisition unit, 4, 4*c*: correction amount setting unit, 5, 5*c*: correction unit, 6: power calculation unit, 7: smallest value tracking unit, 8: threshold calculation unit, 9: comparator, 10, 10*d*: signal determination unit, 10: FFT unit (spectrum transform unit), 11: IFFT unit (spectrum inverse transform unit), 20: microphone array, 21: microphone, 100: sound collecting apparatus, 101: route guidance device, 102: voice recognition device, 103: speech device, 104: active silencing device, 105: display device, 106: communication device, 107: speaker.

The invention claimed is:

1. A sound collecting apparatus comprising:
   a small-signal power acquisition unit that defines a threshold for each of a plurality of input signals based on a long-term average of a minimum power of the corresponding input signal, each of the input signals being obtained by a microphone, and sets a power value of each input signal that is smaller than the corresponding defined threshold to be a small-signal power of the input signals, wherein the long-term average is calculated for each input signal based on a plurality of forgetting coefficient values being applied according to power of the input signal;
   a correction amount setting unit that obtains each correction amount for correcting the input signals based on the small-signal power of each of the input signals; and
   a correction unit that corrects each of the input signals based on each of the correction amounts for correcting the input signals.

2. The sound collecting apparatus according to claim 1, wherein the correction amount setting unit sets the small-signal power of the input signal obtained by a pre-selected one of the microphones as a reference value, and calculates each of the correction amounts for correcting the input signals based on the small signal-power of the input signal which is corrected with the correction amount and the reference value.

3. The sound collecting apparatus according to claim 1 further comprising:
   a spectrum transform unit that transforms each of the input signals to a spectrum which is a signal in frequency domain; and
   an inverse spectrum transform unit that transforms a spectrum which is a signal in frequency domain to a signal in time domain,
   wherein the small-signal power acquisition unit defines the threshold for each input signal in frequency domain, and sets the power spectrum of each input signal that is smaller than the threshold in frequency domain to be a small-signal power spectrum of the input signal,
   the correction amount setting unit obtains each correction amount for correcting the spectrum of each input signal based on the small-signal power spectrum of the input signal,
   the correction unit corrects the spectrum of each input signal based on the correction amount for correcting the spectrum of the input signal, and
   the inverse spectrum transform unit transforms the corrected spectrum of the input signal to a signal in time domain.

4. The sound collecting apparatus according to claim 1 further comprising a signal determination unit that outputs determination information which is information of status of the input signals which is determined by analysis of the input signals,
   wherein the small-signal power acquisition unit performs acquisition process of either the small-signal power or the small-signal power spectrum by use of the determination information.

5. An input signal correcting method applied to a sound collecting apparatus which generates a signal of collected target sound from a plurality of input signals each obtained by a microphone, the input signal correcting method comprising:
   defining a threshold for each of the input signals based on a long-term average of a minimum power of the corresponding input signal, wherein the long-term average is calculated for each input signal based on a plurality of forgetting coefficient values being applied according to a power of the input signal;
   setting a power value of each input signal that is smaller than the corresponding defined threshold to be a small-signal power of the input signal;
   obtaining each correction amount for correcting each of the input signals based on the small-signal power of the input signal; and
   correcting each of the input signals based on the correction amount for correcting the input signal.

6. The input signal correcting method according to claim 5, wherein each correction amount is obtained based on a reference small-signal power which is a small-signal power of an input signal obtained by a pre-selected one of the microphones.

7. A mobile equipment information system comprising:
a sound collecting apparatus that generates an output signal that is a signal of collected target sound emphasized by use of corrected input signals, each of the input signals being obtained by a microphone; and
at least one of a route guidance device which guides a route based on a voice recognition result of the output signal of the sound collecting apparatus, a speech device which uses the output signal, and an active silencing device which uses the output signal,
wherein the sound collecting apparatus defines a threshold for each of the input signals based on a long-term average of minimum power of the corresponding input signal, the long-term average being calculated for each input signal based on a plurality of forgetting coefficient values being applied according to power of the input signal, sets a power value of each input signal that is smaller than the corresponding defined threshold to be a small-signal power of the input signal, obtains each correction amount based on each of the small-signal powers for correcting the input signal corresponding to the small-signal power, and corrects each of the input signals based on each of the correction amounts.

* * * * *